(12) United States Patent
Kojima et al.

(10) Patent No.: US 7,812,934 B2
(45) Date of Patent: Oct. 12, 2010

(54) PHYSICAL QUANTITY MEASURING APPARATUS

(75) Inventors: Seiji Kojima, Hitachi (JP); Shinji Komatsuzaki, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 382 days.

(21) Appl. No.: 12/050,202

(22) Filed: Mar. 18, 2008

(65) Prior Publication Data

US 2008/0309945 A1 Dec. 18, 2008

(30) Foreign Application Priority Data

Mar. 19, 2007 (JP) ............................. 2007-070630

(51) Int. Cl.
*G01B 11/16* (2006.01)
(52) U.S. Cl. .................... 356/32; 250/227.18
(58) Field of Classification Search ............... 356/32, 356/35.5, 478; 250/227.18
See application file for complete search history.

(56) References Cited

U.S. PATENT DOCUMENTS

| 5,319,435 A * | 6/1994 | Melle et al. ............. 356/32 |
| 6,525,308 B1 * | 2/2003 | Schmidt-Hattenberger ....... 250/227.18 |
| 7,283,692 B2 * | 10/2007 | Xiao et al. ............. 356/478 |
| 7,633,052 B2 * | 12/2009 | Nakamura et al. ...... 250/227.14 |
| 7,697,121 B1 * | 4/2010 | Coroy et al. ............ 356/35.5 |

FOREIGN PATENT DOCUMENTS

| JP | 2000-180270 | 6/2000 |
| JP | 200525762 A * | 9/2005 |
| JP | 3760649 | 1/2006 |

OTHER PUBLICATIONS

Norman et al, Interrogation of fibre Bragg grating sensors using an arrayed waveguide grating, Measurement Science and Technology, vol. 16, 2005, pp. 691-698.*
Seiji Kokima et al., High-speed optical wavelength interrogator using a PLC-type optical filter for fiber Bragg grating sensors', Smart Structures and Materials 2004, Proceedings of SPIE vol. 5384. p. 241-249.
NTT Electronics Corporation, Nov. 3, 2006.
NTT Electronics Corporation , Mar. 13, 2007.

* cited by examiner

*Primary Examiner*—Samuel A Turner
(74) *Attorney, Agent, or Firm*—Antonelli, Terry, Stout & Kraus, LLP.

(57) ABSTRACT

A physical quantity measuring system according to the present invention comprises: an optical fiber having fiber Bragg gratings; a light source connected to the optical fiber; an arrayed waveguide grating connected between the light source and the optical fiber via an optical branching filter, and having output channels of which central wavelengths of at least three output channels are included in a one-tenth loss band of a reflected light by the fiber Bragg grating; light receiving devices for receiving light output from the output channels on a one-to-one basis; and a central reflected wavelength change detecting unit connected to the light receiving devices for estimating a change in a central reflected wavelength based on a physical quantity, by calculating first and second group signals from light receiving signals corresponding to the at least three output channels, and by calculating a differential signal between the first and the second group signals.

6 Claims, 10 Drawing Sheets

PHYSICAL QUANTITY MEASURING APPARATUS

CLAIM OF PRIORITY

The present application claims priority from Japanese application serial no. 2007-070630 filed on Mar. 19, 2007, the content of which is hereby incorporated by reference into this application.

BACKGROUND OF THE INVENTION

1. Field of the Invention

The present invention relates to a physical quantity measuring apparatus that is not affected by temperature changes.

2. Description of Related Art

Some physical quantity measuring systems measure temperatures, stresses, and other physical quantities on the basis of changes in central reflected wavelength in fiber Bragg gratings (hereinafter referred to as FBGs) provided in optical fiber. An arrayed waveguide grating (AWG) is used in these physical quantity measuring systems.

FIG. 11 is a schematic illustration showing a structure of a conventional physical quantity measuring apparatus disclosed in Patent Document 1 (JP-B-3760649). This physical quantity measuring apparatus 201 has a plurality of FBGs 204 in an optical fiber 203 to which measurement light is directed from a wide-band light source 202; the wavelength of light reflected from each FBG 204 is detected so as to measure a physical quantity at a position at which the each FBG 204 is disposed. In the physical quantity measuring apparatus 201 shown in FIG. 11, minute reflected light bands are assigned to the plurality of FBGs 204 in such a way that these bands do not overlap each other, and light reflected from each FBG 204 is directed to an AWG 205 where the light is separated into a plurality of output channels, central wavelengths of which are spaced at very short intervals. A light receiving device (photodiode) 206 is provided for each output channel at the output side of the AWG 205. The wavelength of the reflected light is measured based on the logarithm value of a photo-electric current ratio of two adjacent photodiodes 206. The output channel has light transmission characteristics for a particular wavelength band. The central wavelength in the above light transmission characteristics will be referred to below as the central wavelength of the output channel. The physical quantity measuring apparatus 201 assigns each of the reflected light bands of the plurality of FBGs 204 between the central wavelengths of each two adjacent output, channels of the AWG 205. A divider 207 (ranging from, e.g., DIV 1 to DIV 4) outputs the ratio of the photo-electric currents of two adjacent photodiodes 206 as a log value.

FIG. 13 is a schematic illustration showing the structure of another physical quantity measuring apparatus disclosed in Non-patent Document 1.

Non-patent document 1: S. Kojima, A. Hongo, S. Komatsuzaki, and N. Takeda: "High-speed optical wavelength interrogator using a PLC-type optical filter for fiber Bragg grating sensors", SPIE's International Symposium on Smart Structure and Materials, Proceedings of SPIE, Vol. 5384, pp. 241-249, 2004.

The physical quantity measuring apparatus 211 shown in FIG. 13 comprises a wide-band light source 212, an optical branching filter 213, an FBG 214, and an FBG wavelength measuring unit 215. The FBG wavelength measuring unit 215 includes an AWG 216 having 40 output channels, photodiodes 217, each of which is provided on the output side of the AWG 216 for each output channel, A/D converters (ADCs) 218 connected to the photodiodes 217 on a one-to-one basis, and a CPU 219 that uses data output from the A/D converters 218 to carry out calculation for physical quantities.

An example of measurement by the use of the physical quantity measuring apparatus 211 shown in FIG. 13 will be described. When changes in central reflected wavelength of the FBGs 214 are measured by the physical quantity measuring apparatus 211, the central reflected wavelength of the FBGs 214 is set up close to the center of the central wavelengths of two adjacent output channels (e.g., output channels A and B) of the AWG 216. In this case, for example, the output channel A has shorter central wavelength than the central reflected wavelength of FBG, and the output channel B has longer central wavelength than that.

FIG. 14 is a graph showing an example of a relationship between a loss and a wavelength of spectrum exhibiting reflection characteristics (reflection spectrum) of the FBG and channel-specific transmission characteristics (transmission spectrum) of the AWG in the prior art. In the figure, it is assumed that the full width of half maximum of the reflection spectrum of the FBG is 0.5 nm, and the distance between the central wavelengths of two adjacent output channels (output channels A and B, for example) of the AWG is 0.8 nm. The reflected light from the FBG 214 is then branched to output channel A and output channel B of the AWG 216, according to its wavelength. If the central reflected wavelength of the FBG 214 is shortened, current, the intensity of which is proportional to the amount of light, that is output from the photodiode 217 corresponding to output channel A of the AWG 216 increases. The voltage output from an A/D converter 218, which converts a current from the photodiode 217 to a voltage and outputs the converted voltage, also increases. Conversely, current, the intensity of which is proportional to the amount of light, that is output from the photodiode 217 corresponding to output channel B of the AWG 216 decreases. The voltage output from the A/D converter 218, which converts the current from the photodiode 217 to a voltage and outputs the converted voltage as described above, also decreases. If the central reflected wavelength of the FBG 214 is prolonged, an operation that will be performed is opposite to the operation performed when a change to a short wavelength occurs.

As described above, the amount of reflected light, which is transmitted to each output channel of the AWG 216, may increase or decrease depending on whether the central reflected wavelength of the FBG 214 is shortened or prolonged. Accordingly, after the transmitted light is converted by the photodiode 217 and A/D converter 218 to a voltage, a change in the central reflected wavelength of the FBG, which is measured in advance, is compared with a ratio between output voltages dependent on the amounts of light form the output channels of the AWG so as to detect a change in the central reflected wavelength of the FBG. The AWG 216 functions as an optical filter that converts a change in the central reflected wavelength of the FBG 214 to an equivalent change in the amount of light. This type of optical filter has no movable part, so it is suitable to a system that need to highly precisely measure changes in the central reflected wavelength of the FBG 214, which occurs at a high frequency.

FIG. 15 is a schematic illustration showing an elastic waveform measuring apparatus. The elastic waveform measuring apparatus 221 shown in FIG. 15 is devised by remodeling the physical quantity measuring apparatus 211 shown in FIG. 13 so that elastic waves can be measured; an FBG 224 and a PZT actuator 223 for generating vibration are provided on, e.g., a carbon fiber reinforced plastic (CFRP) laminated plane 222. Distortion generated in the CFRP laminated plane 222 is detected from a change in the central reflected wavelength of the FBG 224 with respect to the elastic wave from the PZT actuator 223.

FIG. 16 is a time waveform diagram showing an example of an input voltage signal to a PZT actuator. Specifically, when a voltage signal (PZT input) as shown in FIG. 16 is applied to the PZT actuator 223, an elastic wave is transmitted from the PZT actuator 223 to the CFRP laminated plane 222 and then to the FBG 224. Signals are then output from the photodiodes 217 corresponding to output channels A and B of the AWG 216 shown in FIG. 13 to the corresponding ADCs 218, AC components of the signals being represented by output voltage changes. The signals have the same cycle but have opposite polarities, as shown in FIG. 17. FIG. 17 is a time waveform diagram showing output voltages of output channels A and B of the AWG.

When a difference is taken between the outputs from output channels A and B, shown in FIG. 17 (the outputs are converted voltages), a waveform of a differential signal that represents a change in the central reflected wavelength of the FBG 224 as a voltage change is obtained, as shown in FIG. 18. FIG. 18 is a time waveform diagram showing an output voltage of a differential signal between the outputs from output channels A and B, shown in FIG. 17. If the signal includes noise, when measurement is repeated a plurality of times, e.g., 1000 times, and an average is taken to eliminate the noise.

In the channel-specific transmission characteristics shown in FIG. 14, changes in the position of the central reflected wavelength of the FBG 224, which is set up between the central wavelengths of the adjacent output channels of the AWG 216, can be represented as changes in voltage signal amplitude, as shown in FIG. 19. FIG. 19 is a graph showing a relationship between amplitude of signal and a relative distance of FBG in the conventional physical quantity measuring apparatus. FIG. 19 plots, on the horizontal axis, the relative distance from the center of the central wavelengths of two adjacent output channels of the AWG 216 (see FIG. 14) to the central reflected wavelength of the FBG 224. The coordinates of the center of the central wavelengths of the two adjacent output channels of the AWG 216 are set to 0%. The coordinates at which the central wavelength of the output channel having the shorter wavelength of the two adjacent output channels of the AWG 216 matches the central reflected wavelength of the FBG 224 are set to −50%. On the other hand, the coordinates at which the central wavelength of the output channel having the longer wavelength of the two adjacent output channels of the AWG 216 matches the central reflected wavelength of the FBG 224 are set to 50%. The relative distance is obtained by dividing the distance between the central reflected wavelength of the FBG and the central wavelength of output channel A or B, whichever is closer to the central reflected wavelength of the FBG, by the interval between adjacent output channels of the AWG.

In FIG. 19, waveforms that will appear in a zone less than −50% and a zone exceeding 0% can be thought to be nearly symmetric to a waveform in a zone from −50% to 0% when the waveform of an output channel further adjacent to an adjacent output channel of the AWG 216 (for example, an output channel having a short wavelength that is adjacent to output channel A in FIG. 14 or an output channel having a long wavelength that is adjacent to channel B) is considered. Therefore, these waveforms are omitted in FIG. 19.

With the physical quantity measuring apparatus 201 in FIG. 11, the central reflected wavelength of the FBG 204 must be assigned between the central wavelengths of two adjacent output channels of the AWG 205 as mentioned before, and must be also assigned on a straight part (part where nearly liner approximation is possible) in characteristics of the central reflected wavelength of the FBG 204 versus the log value of a photo-electric current ratio between output channels, as shown in FIG. 12. FIG. 12 is a graph showing a relationship between the logarithm value of a photo-electric current ratio and a central reflected wavelength of an FGB. Accordingly, problems described below arise.

If the central reflected wavelength of the FBG 204 changes by more than the interval (separate wavelength bandwidth) between central wavelengths of two adjacent output channels of the AWG 205, it is hard for the physical quantity measuring apparatus 201 in FIG. 11 to detect such a change. This is because if the AWG 205 has output channels with a large width so as to detect a large change in the central reflected wavelength of the FBG 204, the log value changes insensitively with respect to the wavelength, so it is hard to detect a minute change in the central reflected wavelength of the FBG 204. For example, AWGs 205 with output channel widths of 0.2, 0.4, 0.6, 0.8, and 1.6 nm are commercially available at present (see Non-patent Document 2). By contrast, distortion sensitivity and temperature sensitivity of the FBG 204 are respectively about 1.2 pm/microstrain and 10 pm/° C.; when strain of 1400 microstrain or more is measured, the central reflected wavelength of the FBG 204 changes by 1.6 nm or more. Therefore, it is hard to use the above commercial AWGs 205 to measure strain that appears as changes in the central reflected wavelength of the FBG 204.

Non-patent document 2: Homepage of NTT Electronics Corporation, http://www.nel-world.com/products/photonics/awg_mul_d.html (uploaded on Nov. 3, 2006).

Another problem is that, to assign a linear part in the characteristics of the central reflected wavelength of the FBG 204 versus the log value within the central reflected wavelength range of the FBG 204, the central reflected wavelengths of the AWG 205 and FBG 204 must be strictly designed. If the central reflected wavelength of the FBG 204 is likely to change beyond the wavelength range of the AWG 205 due to an effect by temperature or strain, the strain or temperature of the AWG 205 must be adjusted (modulated) so that the central reflected wavelength of the FBG 204 falls within the linear part in the characteristics of the central reflected wavelength of the FBG 204 versus the log value, involving extra work in manufacturing and measuring.

The central wavelength of each channel of the AWG 205 changes by about 10 pm/° C. depending on the temperature. To highly precisely detect the amount of which the central reflected wavelength of the FBG 204 changes, therefore, the temperature of the AWG 205 must be kept fixed, so a heater, Peltier element, or other equipment for keeping the temperature of the AWG 205 fixed must be added. Although athermal AWGs with a central wavelength change of as small as several tens of picometers within a temperature range of 0 to 60° C. are also available (see Non-patent Document 3), the use of an athermal AWG of this type increases the cost to manufacture of the physical quantity measuring apparatus.

Non-patent document 3: Homepage of NTT Electronics Corporation http://www.nel-world.com/products/photonics/ather_awg.html (uploaded on Mar. 13, 2007).

On the other hand, when the physical quantity measuring apparatus 211 shown in FIG. 13 is used in a measuring apparatus as shown in FIG. 15, if the central reflected wavelength of the FBG 224 is located at the center of the central wavelengths of two adjacent output channels of the AWG 216 (the relative distance is 0%) as shown in FIG. 19, the amplitude of the voltage signal is maximized. If the central wavelength of the AWG 216 and the central reflected wavelength of the FBG 224 overlap each other (the relative distance is −50%), the amplitude of the voltage signal is minimized; the amplitude of the voltage signal is just about one-twentieth the amplitude obtained when the relative distance is 0%.

The central reflected wavelength of the FBG 224 changes according to the change of the temperature or strain at the strain measurement place (place where the FBG is disposed). When the central reflected wavelength of the FBG changes, the amplitude of the voltage signal decreases. Accordingly, to prevent the amplitude of the voltage signal from decreasing, the relative distance between the center of the wavelengths of the two adjacent output channels of the AWG 216 and the central reflected wavelength of the FBG 224 must be controlled so that superior sensitivity is obtained in measurement of a change in the central reflected wavelength of the FBG 224. For this purpose, the temperature of the AWG 216 has been preferably adjusted so that the central reflected wavelength of the FBG 224 is located at the center of the central wavelengths of the two adjacent output channels of the AWG 216 during physical quantity measurement.

However, it is hard to always adjust the temperature of the AWG 216. Accordingly, in the physical quantity measuring apparatus as shown in FIG. 13, a large signal amplitude should be obtained without the temperature of the AWG having to be adjusted.

SUMMARY OF THE INVENTION

Under these circumstances, the present invention is originated to solve the above problems. It is an objective of the present invention to provide a physical quantity measuring apparatus which produces a fixed signal amplitude independently of the positional relation between the central reflected wavelength of an FBG and the central wavelengths of two adjacent output channels of the AWG, without a temperature control means having to be added to the AWG.

(1) According to one aspect of the present invention, a physical quantity measuring apparatus comprises: an optical fiber in which fiber Bragg gratings are formed; a light source which is connected to the optical fiber, and that has a light emitting band including a band in which the central reflected wavelengths of the fiber Bragg gratings change; an arrayed waveguide grating which is connected between the light source and the optical fiber via an optical branching filter, and that has output channels of which central wavelengths of at least three output channels are included in a one-tenth loss band of a reflected light by the fiber Bragg grating; light receiving devices for receiving light output from the output channels of the arrayed waveguide grating on a one-to-one basis; and a central reflected wavelength change detecting unit which is connected to the light receiving devices for estimating a change in a central reflected wavelength based on a physical quantity, by calculating a first group signal and a second group signal from light receiving signals corresponding to the at least three output channels and by calculating a differential signal between the first group signal and the second group signal, wherein: the central wavelengths of output channels comprising the first group signal are shorter than the central reflected wavelength of the fiber Bragg grating; and the central wavelengths of output channels comprising the second group signal are longer than the central reflected wavelength of the fiber Bragg grating.

In the above invention (1), the following modifications and changes can be made.

(i) The central reflected wavelength change detecting unit is further configured to store a relation which is obtained in advance between the differential signal and the change in the central reflected wavelength, and to determine the change in the central reflected wavelength by applying the calculated differential signal through an actual measurement to the relation.

(ii) The central reflected wavelength change detecting unit is further configured to obtain the first group signal and the second group signal by removing a DC component from the light receiving signal output from each of the light receiving devices and by using an AC component thereof in calculation.

(iii) The fiber Bragg grating is formed so that a full width of half maximum of the reflected light is at least 1.6 times longer than a distance between the central wavelengths of two adjacent output channels.

(iv) A plurality of fiber Bragg gratings of which the central reflected wavelengths change in different ranges are formed in the optical fiber; and the arrayed waveguide grating includes the central wavelengths of at least three output channels in a one-tenth loss band of the reflected light by each fiber Bragg grating.

(v) At least three output channels are respectively included in the one-tenth loss band of the reflected light by the fiber Bragg grating on both a short wavelength side and a long wavelength side relative to the central reflected wavelength of the fiber Bragg grating; and the central reflected wavelength change detecting unit is further configured to obtain the first group signal by adding light receiving signals corresponding to the at least three output channels of which the central wavelengths are on the short wavelength side, to obtain the second group signal by adding light receiving signals corresponding to the at least three output channels of which the central wavelengths are on the long wavelength side, and to estimate the change in the central reflected wavelength by calculating a differential signal between the first group signal and the second group signal.

ADVANTAGES OF THE INVENTION

According to the present invention, it is possible to provide a physical quantity measuring apparatus which produces a fixed signal amplitude independently of the positional relation between the central reflected wavelength of an FBG and the central wavelengths of output channels of the AWG, without a temperature control means having to be added to the AWG.

DETAILED DESCRIPTION OF THE PREFERRED EMBODIMENTS

A preferred embodiment of the present invention will be described in detail with reference to the attached drawings. However, the present invention is not limited to the embodiments described herein.

Figure 1:
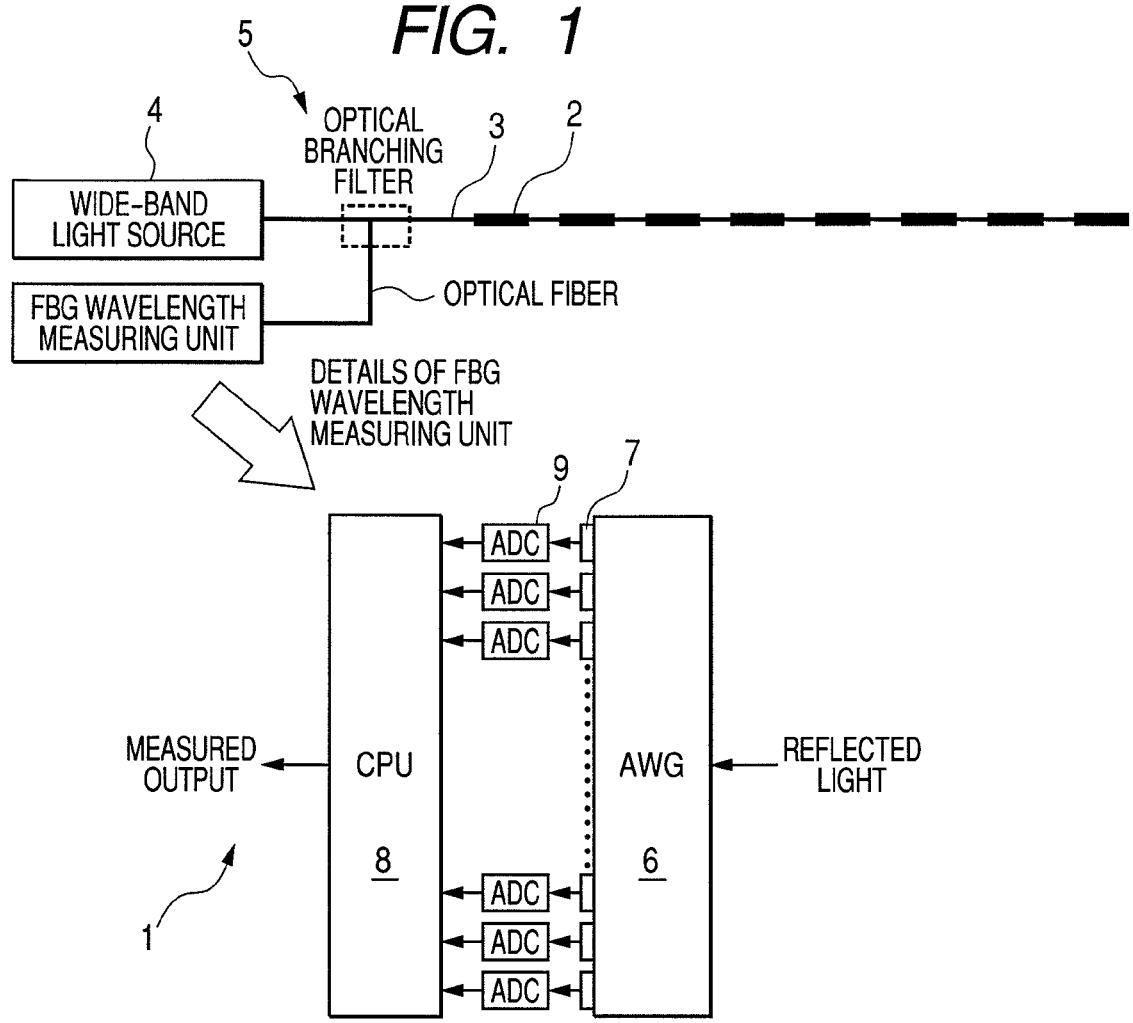
FIG. 1 is a schematic illustration showing an example of the structure of a physical quantity measuring apparatus in an embodiment according to the present invention.

FIG. 1 is a schematic illustration showing an example of the structure of a physical quantity measuring apparatus in an embodiment according to the present invention. As shown in FIG. 1, the physical quantity measuring apparatus 1 comprises: an optical fiber 3 in which fiber Bragg gratings (FBGs) 2 are formed; a light source 4 which is connected to the optical fiber 3, and that has a light emitting band including a band in which central reflected wavelengths of the fiber Bragg gratings 2 change; an arrayed waveguide grating (AWG) 6 which is connected between the light source 4 and the optical fiber 3 via an optical branching filter 5, and that has output channels of which central wavelengths of at least three output channels are included in a one-tenth loss band of a reflected light by the fiber Bragg gratings 2; light receiving devices 7 for receiving light output from output channels of the arrayed waveguide grating 6 on a one-to-one basis; and a central reflected wavelength change detecting unit 8 which is connected to the light receiving devices for estimating a change in a central reflected wavelength based on a physical quantity, by calculating a first group signal (group signal A) and a second group signal (group signal B) from light receiving signals corresponding to the at least three output channels and by calculating a differential signal between group signals A and B. Here, the central wavelengths of output channels comprising the group signal A are shorter than the central reflected wavelength of the fiber Bragg grating 2; and the central wavelengths of output channels comprising the group signal B are longer than the central reflected wavelength of the fiber Bragg grating 2.

The one-tenth loss band of the FBG 2 is defined with a wavelength at which the amount of reflected light is one-tenth of a maximum amount of reflected light of the fiber Bragg grating 2. That is, a wavelength band where the amount of reflected light is equal to or more than one-tenth of the maximum amount of reflected light is defined as the one-tenth loss band. Suppose that the one-tenth loss band of the fiber Bragg grating 2 is fixed. Then, the present invention can be structured by using the AWG 6 in which at least three output channels are spaced so that the central wavelengths thereof are included in the one-tenth loss band.

In this embodiment, a plurality of fiber Bragg gratings 2 having different bands within which central reflected wavelengths change are formed in the optical fiber 3. Of course, single fiber Bragg grating may be formed in the optical fiber 3. In the AWG 6, the central wavelengths of at least three output channels are included in the one-tenth loss band of each fiber Bragg grating 2. The light source 4 has a wide light emitting band including a band in which the central reflected wavelengths of all the fiber Bragg gratings 2 change.

The central reflected wavelength change detecting unit 8 includes a CPU (central processing unit). Accordingly, A/D converters (ADCs) 9 for converting signals from the light receiving devices (photodiodes) 7 to digital signals are provided between the light receiving devices 7 and the central reflected wavelength change detecting unit 8. The central reflected wavelength change detecting unit 8 uses signals from at least three light receiving devices 7 to estimate a change in the central reflected wavelength in one fiber Bragg grating 2, according to the following algorithm (the signals from the light receiving devices are digital; this is also true in the description that follows). Group signal A is calculated from a light receiving signal corresponding to an output channel having a central wavelength shorter than the central reflected wavelength of the fiber Bragg grating 2; group signal B is calculated from a light receiving signal corresponding to an output channel having a central wavelength longer than the central reflected wavelength of the fiber Bragg grating 2; and a differential signal between group signals A and B is calculated in order to estimate the change in the central reflected wavelength of the fiber Bragg grating 2 based on a physical quantity.

As a specific example, suppose that reflected light from one fiber Bragg grating 2 is received by six light receiving devices 7. The central reflected wavelength change detecting unit 8 is configured to take summation of signals which are output from three light receiving devices 7 and that have a wavelength shorter than the central reflected wavelength of the fiber Bragg grating 2, and the resulting signal is denoted group signal A. Similarly, the central reflected wavelength change detecting unit 8 is configured to take summation of signals which are output from the remaining three light receiving devices 7 and that have a wavelength longer than the central reflected wavelength of the fiber Bragg grating 2, and the resulting signal is denoted group signal B. A difference between the group signals A and B is then taken.

If a change in the central reflected wavelength of the fiber Bragg grating 2, that is, a difference between a wavelength before the change and a wavelength after the change is measured in advance and the amplitude of this differential signal is measured, correspondence between changes in the central reflected wavelength and the amplitude of the differential signal can be obtained. The central reflected wavelength change detecting unit 8 may have a storage means for storing this correspondence. After the correspondence is stored, when the calculated differential signal through an actual measurement is applied to the correspondence, a change in the central reflected wavelength can be determined.

The central reflected wavelength change detecting unit 8 is further configured to obtain the group signals A and B by removing a DC component from the light receiving signal output from the light receiving device 7 and by retrieving only an AC component thereof. The AC component means the output voltage change. The central reflected wavelength change detecting unit 8 uses the AC component in calculation of group signals A and B.

Advantages of the physical quantity measuring apparatus 1 shown in FIG. 1 will be described below. In the description that follows, the fiber Bragg grating and arrayed waveguide grating are respectively abbreviated to FBG and AWG.

As mentioned before, in the physical quantity measuring apparatus 1 according to the present invention, the central wavelengths of at least three output channels of the AWG 6 are included in the one-tenth loss band of the FBG 2. That is, the one-tenth loss band of the FBG 2 covers at least three output channels; when light reflected from the FBG 2 is directed to the AWG 6, the reflected light appears in the at least three output channels. If the central reflected wavelength of the FBG 2 changes, signal amplitudes also change in light receiving devices 7 disposed in the at least three output channels.

The present invention was completed through eager study by the inventors. It is that sensitivity reduction due to a relative distance of a physical quantity measuring apparatus can be avoided when the central wavelengths of at least three output channels of the AWG 6 are set to be included in the one-tenth loss band of the FBG 2 and the aforementioned algorithm is applied. When the sensitivity reduction due to the relative distance is eliminated, even if the central wavelengths of output channels change due to an AWG temperature change, received signals are not affected. As a result, the AWG temperature does not need to be adjusted and a minute change in the central reflected wavelength of the FBG can be detected with high precision.

Next, a specific example is given. Suppose that, in a conventional AWG, the distance (interval) between the central wavelengths of two adjacent output channels is 1.6 nm; the full width of half maximum of the output channel is 0.8 nm; the maximum transmittance is 100%; and a waveform of transmission characteristics is represented by a Gaussian curve. Also suppose that, in the conventional AWG, the central wavelengths of four output channels are included in a wavelength range of 1539 to 1543.8 nm. For an FBG, suppose that the full width of half maximum of reflected light is 0.8 nm; the maximum transmittance is 100%; and a waveform of reflection characteristics is also represented by a Gaussian curve.

Figure 2:
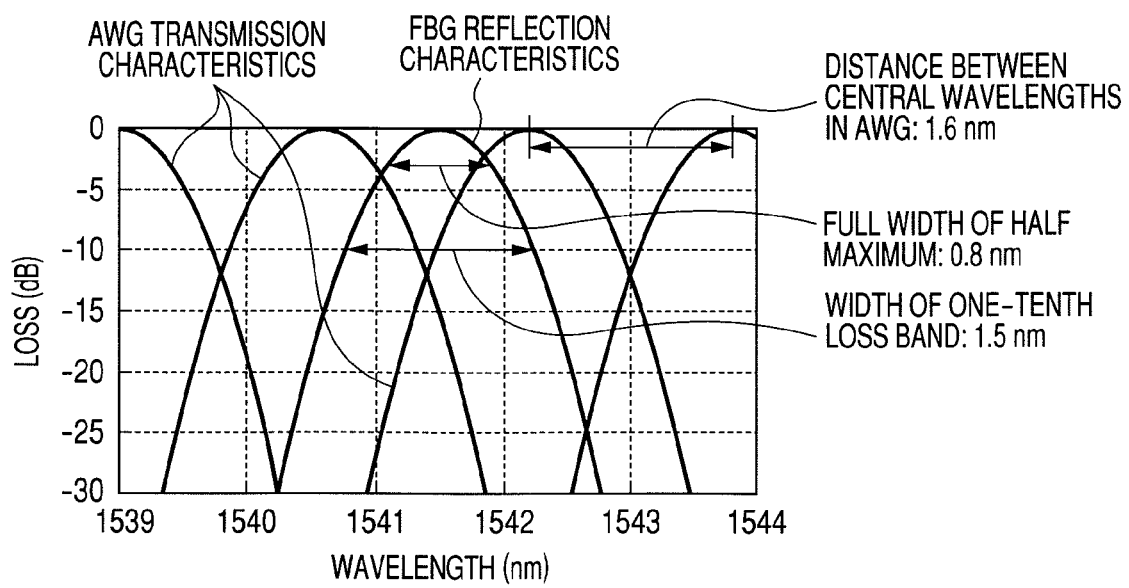
FIG. 2 is a graph showing a relationship between a loss and a wavelength of spectrum exhibiting FBG reflection characteristics and AWG transmission characteristics in a conventional physical quantity measuring apparatus.

FIG. 2 is a graph showing a relationship between a loss and a wavelength of spectrum exhibiting FBG reflection characteristics and AWG transmission characteristics in a conventional physical quantity measuring apparatus. As shown in FIG. 2, 1.5 nm is the one-tenth loss band of the FBG defined with a wavelength at which the amount of reflected light is one-tenth the maximum amount of reflected light. This one-tenth loss band is narrower than the distance between the central wavelengths of two adjacent output channels of the AWG. Only one central wavelength of the AWG can then be included in the one-tenth loss band of the FBG. That is, this arrangement is not applicable to the present invention.

In the AWG 6 of the physical quantity measuring apparatus 1 shown in FIG. 1, e.g., it is configured that the distance between central wavelengths of two adjacent output channels is 0.4 nm; the full width of half maximum of the output channel is 0.2 nm; the maximum transmittance is 100%; and a waveform of transmission characteristics is represented by a Gaussian curve. Also in the AWG 6, suppose that the central wavelengths of 13 output channels are included in a wavelength range of 1539 to 1543.8 nm. For the FBG 2, suppose that the full width of half maximum of reflected light is 0.8 nm; the maximum transmittance is 100%; and a waveform of reflection characteristics is represented by a Gaussian curve.

Figure 3:
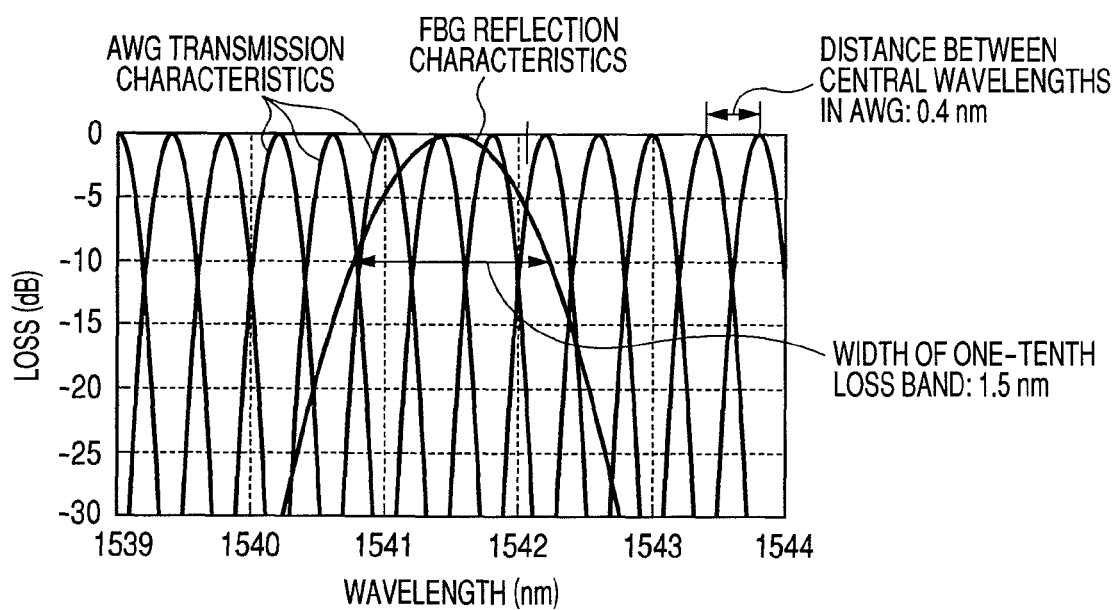
FIG. 3 is a graph showing an example of a relationship between a loss and a wavelength of spectrum exhibiting FBG reflection characteristics and AWG transmission characteristics in the physical quantity measuring apparatus according to the present invention.

FIG. 3 is a graph showing an example of a relationship between a loss and a wavelength of spectrum exhibiting FBG reflection characteristics and AWG transmission characteristics in the physical quantity measuring apparatus according to the present invention. As shown in FIG. 3, 1.5 nm is the one-tenth loss band of the FBG 2 defined with a wavelength at which the amount of reflected light is one-tenth the maximum amount of reflected light, same as in FIG. 2. Unlike FIG. 2, however, this one-tenth loss band is wider than the distance between central wavelengths in the AWG 6. A maximum of three central wavelengths in the AWG 6 can then be included in the one-tenth loss band in the FBG 2. That is, this arrangement is applicable to the present invention.

More specifically, when the following relation is satisfied, an arrangement applicable to the present invention can be achieved.

$$\text{(Width of one-tenth loss band)} > \text{(distance between central wavelengths of two adjacent output channels of AWG)} \times 3 \quad (1)$$

Figure 4:
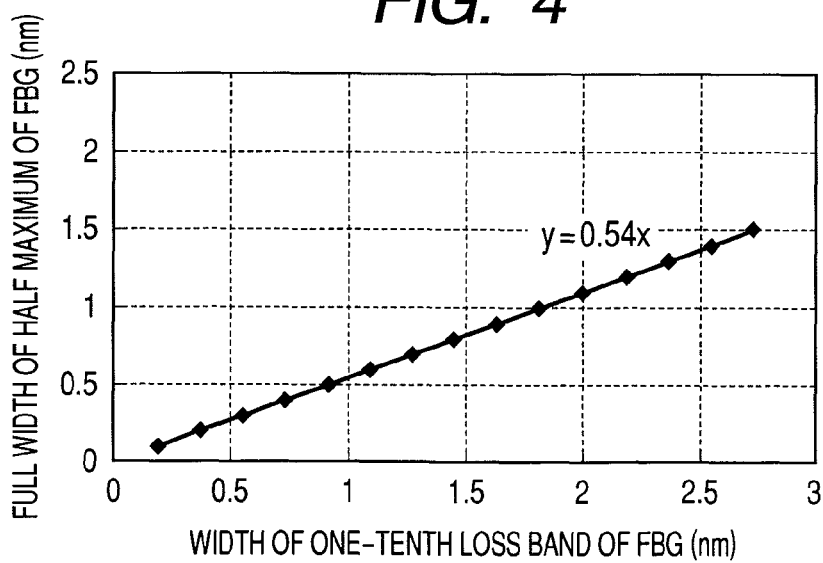
FIG. 4 is a graph showing a relationship between a full width of half maximum of an FBG and a one-tenth loss band.

A full width of half maximum of a spectrum is usually used to represent reflection characteristics of an FBG, so the above one-tenth loss band may be replaced with a full width of half maximum. When reflection characteristics are represented by a Gaussian curve, the relation between the full width of half maximum of the FBG and the width of the one-tenth loss band is approximately linear, as shown in FIG. 4; the inclination is about 0.54. FIG. 4 is a graph showing a relationship between a full width of half maximum of an FBG and a one-tenth loss band.

That is, the full width of half maximum is about half (0.54) the width of the one-tenth loss band, so the following relation holds.

$$\text{(Full width of half maximum of FBG)} > \{\text{(distance between central wavelengths of two adjacent output channels of AWG)} \times 3 \times 0.54 \quad (2)$$

Accordingly, if the FBG has a full width of half maximum 1.6 times greater than the distance between the central wavelengths of two adjacent output channels of the AWG, the reflected light of the FBG can be output from at least three output channels of the AWG that are sequentially adjacent to one another. In this case as well, sensitivity reduction due to a relative distance (see FIG. 19) can be avoided.

Figure 15:
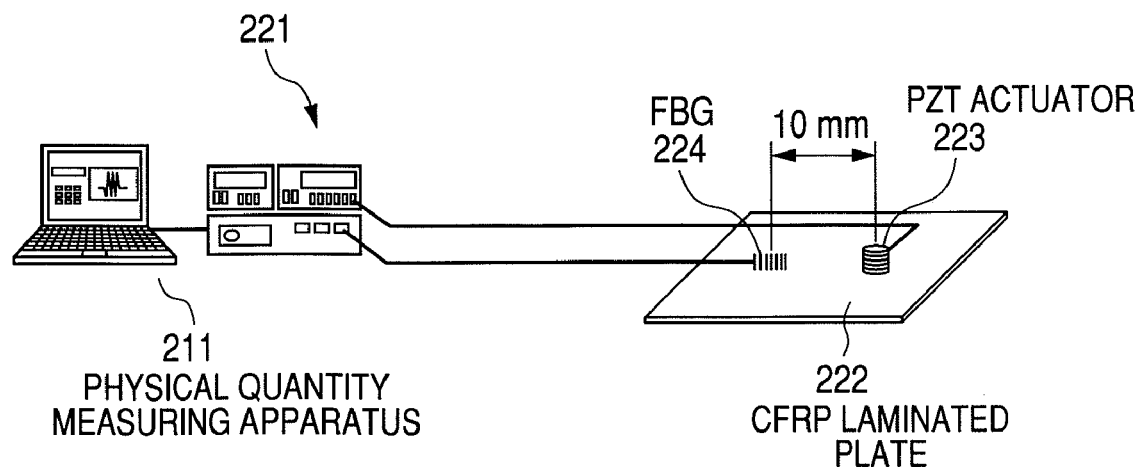
FIG. 15 is a schematic illustration showing an elastic waveform measuring apparatus.

Next, a case in which the physical quantity measuring apparatus 1 according to the present invention is applied to the elastic waveform measuring apparatus 221 shown in FIG. 15 will be described. FIG. 15 is a schematic illustration showing an elastic waveform measuring apparatus.

Figure 5:
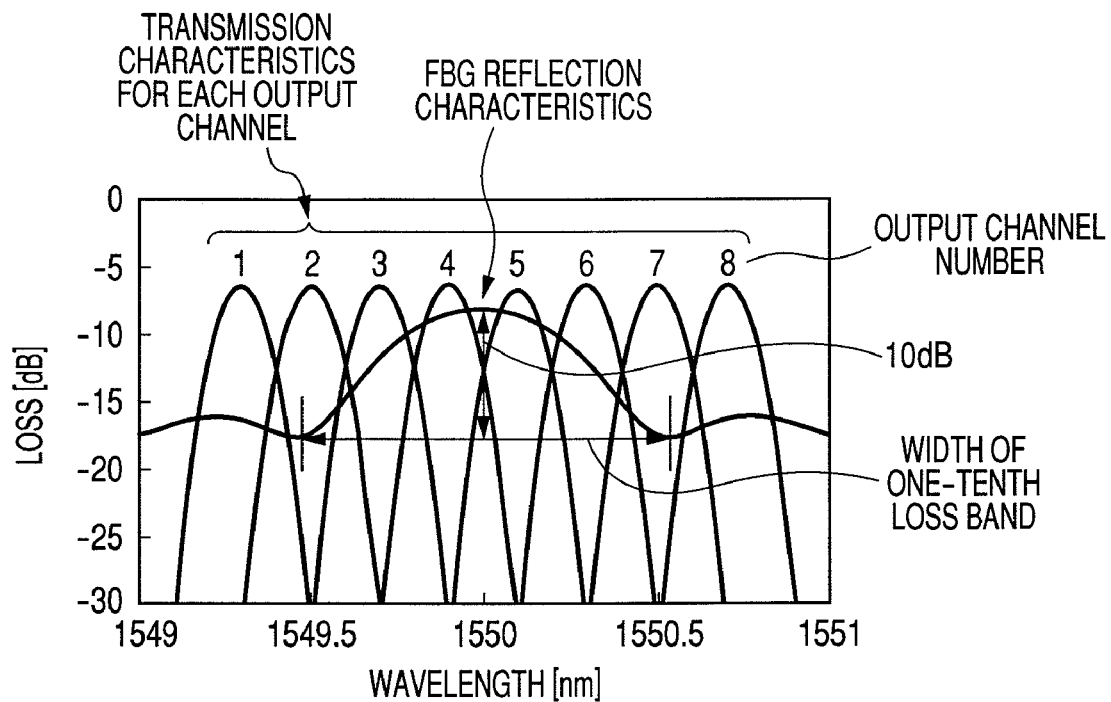
FIG. 5 is a graph showing another example of a relationship between a loss and a wavelength of spectrum exhibiting the reflection characteristics of the FBG and channel-specific transmission characteristics of the AWG in the physical quantity measuring apparatus according to the present invention.
Figure 6:
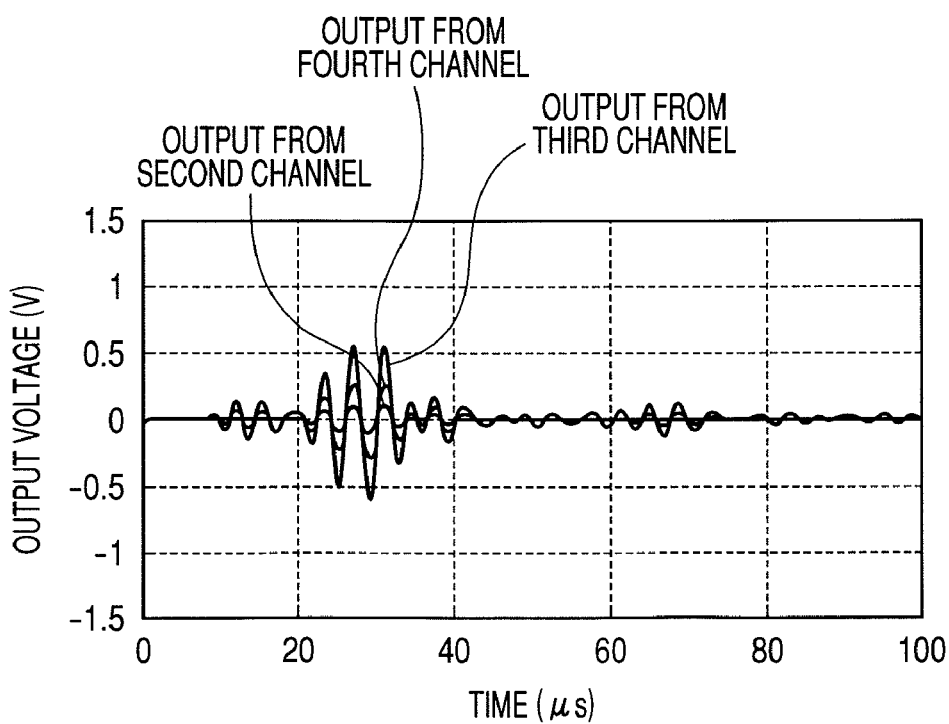
FIG. 6 is a time waveform diagram showing output voltages of second to fourth channels of the AWG.
Figure 16:
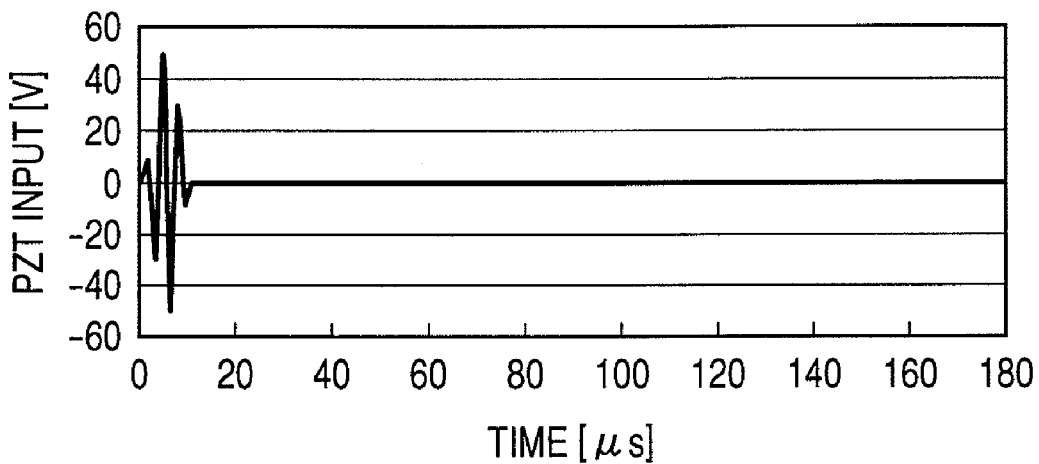
FIG. 16 is a time waveform diagram showing an example of an input voltage signal to a PZT actuator.

When the full width of half maximum of the FBG 2 is set to 0.5 nm and the distance between the central wavelengths of two adjacent output channels of the AWG 6 is set to 0.2 nm, as shown in FIG. 5, the one-tenth loss band of the FBG 2 includes the central wavelengths of a second output channel to a seventh output channel of the AWG 6. In this arrangement, elastic waves are measured. A signal applied to a PZT actuator 223 is a voltage signal (PZT input) having characteristics as shown in FIG. 16. FIG. 16 is a time waveform diagram showing an example of an input voltage signal to a PZT actuator. Voltage signals having only an AC component, which are output from photodiodes 7 corresponding to the second to fourth output channels of the AWG 6, are supplied to corresponding ADCs 9 and then output from the ADCs 9. During this process, the voltage signals change as shown in FIG. 6. FIG. 6 is a time waveform diagram showing output voltages of second to fourth channels of the AWG. That is, changes in the output voltages (corresponding to the second to fourth output channels) have the same cycle and the same polarity, and the output voltage from the third output channel has the largest amplitude. This is because the curve of the FBG reflection characteristics is sharpest in the transmission band of the third output channel and is gentle in that of the fourth output channel.

Figure 7:
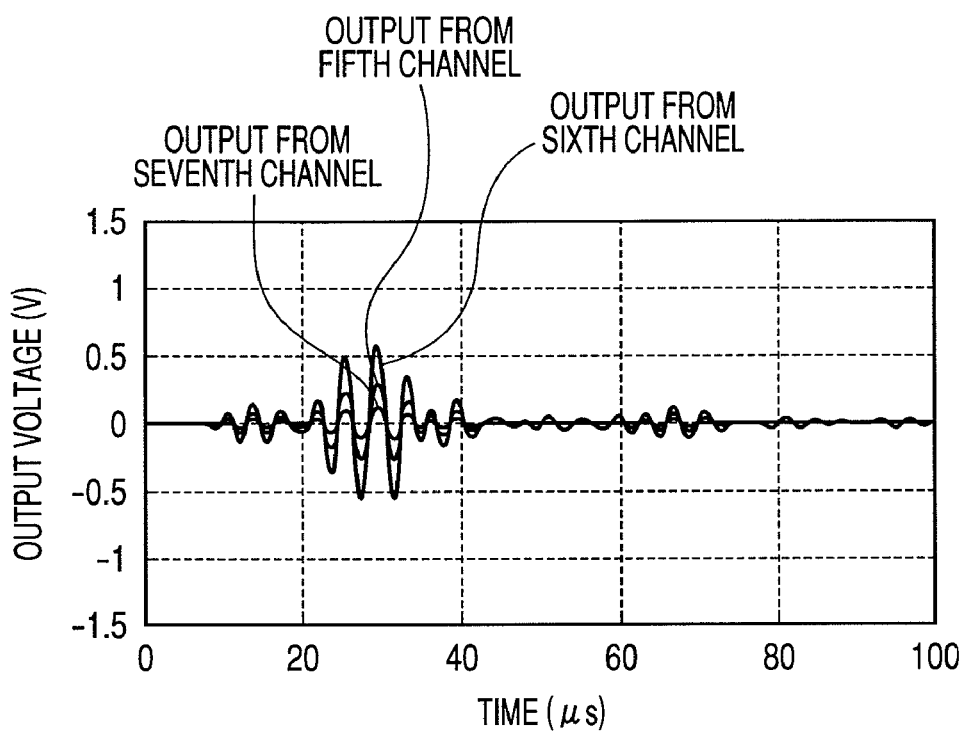
FIG. 7 is a time waveform diagram showing output voltages of fifth to seventh channels of the AWG.

Similarly, voltage signals having only an AC component, which are output from photodiodes 7 corresponding to the fifth to seventh channels of the AWG 6, are supplied to corresponding ADCs 9 and then output from the ADCs 9. During this process, the voltage signals change as shown in FIG. 7. FIG. 7 is a time waveform diagram showing output voltages of fifth to seventh channels of the AWG. That is, changes in the output voltages (corresponding to the fifth to seventh output channels) have the same cycle and the same polarity, and the output from the sixth output channel has the largest amplitude. This is because the curve of the FBG reflection characteristics is sharpest in the transmission band of the sixth output channel and is gentle in that of the seventh output channel.

Figure 8:
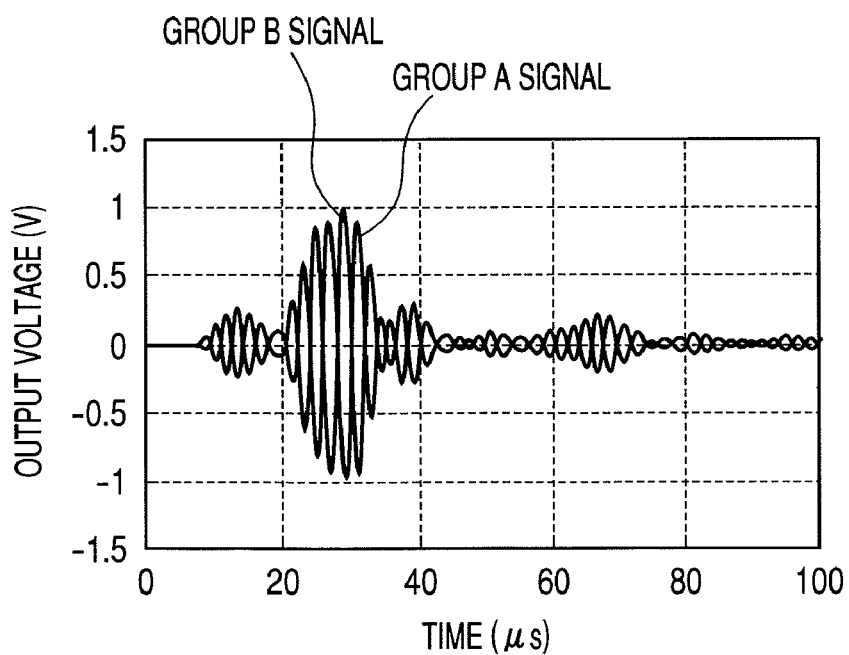
FIG. 8 is a time waveform diagram showing output voltages of group signal A and group signal B, in which group signal A is obtained by summation of changes in the output voltages from the second to fourth channels; group B signal is obtained by summation of changes in the output voltages from the fifth to seventh channels.

Summation of the outputs delivered from the ADCs 9 corresponding to the second to fourth output channels of the AWG 6 is taken, and the resulting signal is denoted group signal A; summation of the outputs delivered from the ADCs 9 corresponding to the fifth to seventh output channels of the AWG 6 is taken, and the resulting signal is denoted group signal B. FIG. 8 is a time waveform diagram showing output voltages of group signal A and group signal B, in which group signal A is obtained by summation of changes in the output voltages from the second to fourth channels; group B signal is obtained by summation of changes in the output voltages from the fifth to seventh channels. As shown in FIG. 8, group signals A and B have the same cycle but have opposite polarities.

Figure 9:
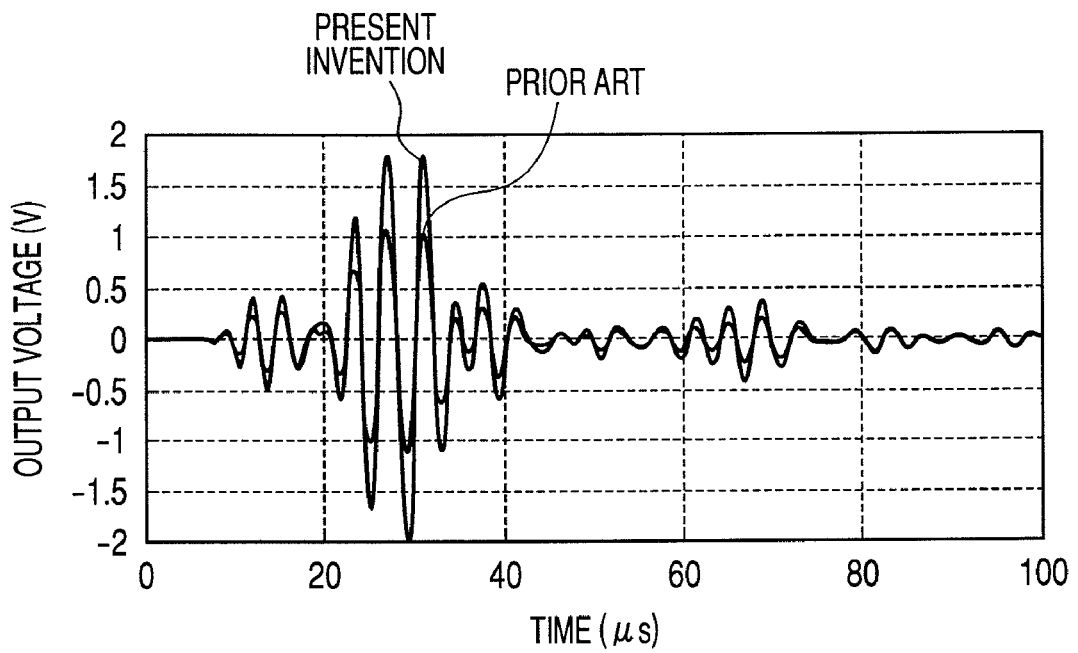
FIG. 9 is a time waveform diagram showing an output voltage of a differential signal between two group signals in the present invention (group signal A and group signal B in FIG. 8), accompanying with another differential signal in prior art (FIGS. 17 and 18).
Figure 17:
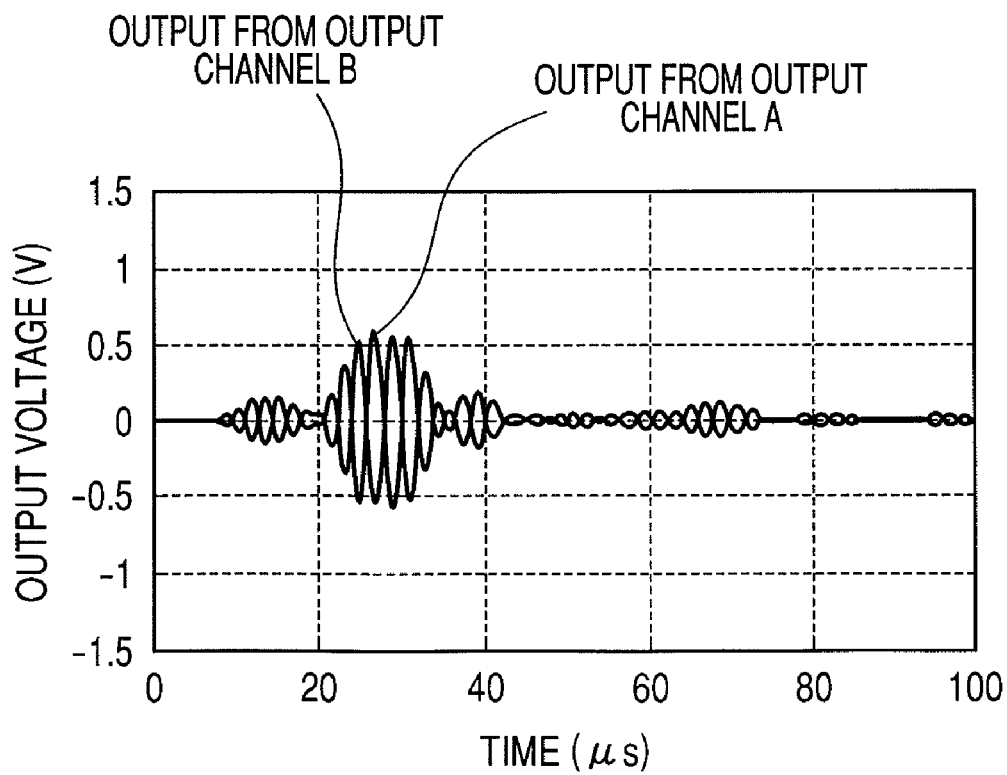
FIG. 17 is a time waveform diagram showing output voltages of output channels A and B of the AWG.
Figure 18:
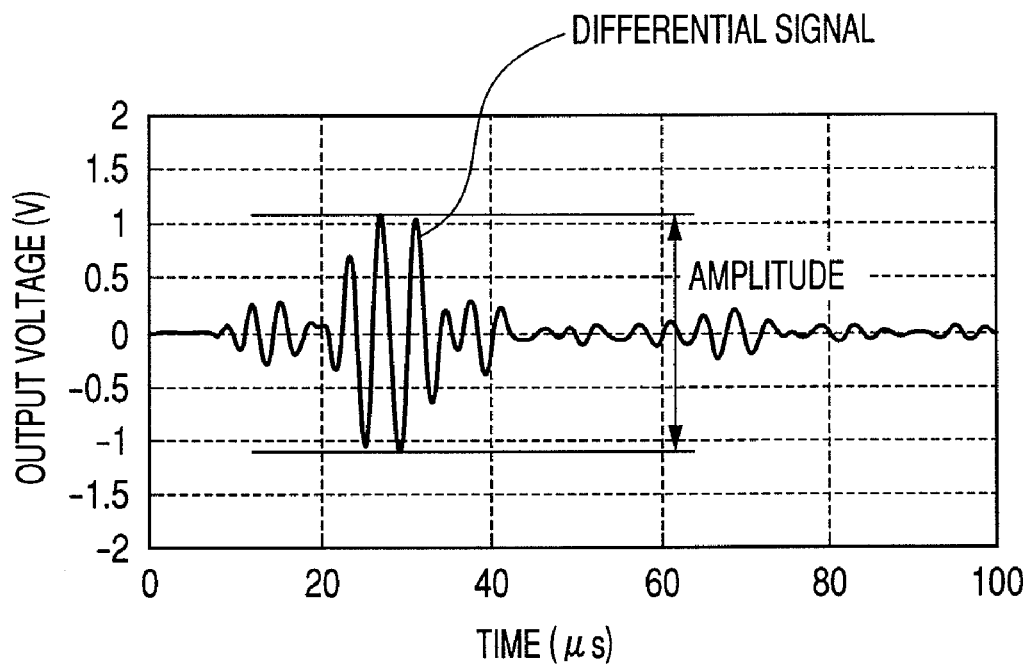
FIG. 18 is a time waveform diagram showing an output voltage of a differential signal between the outputs from output channels A and B, shown in FIG. 17.

When a difference is taken between group signals A and B, a waveform of a differential signal is obtained as shown in FIG. 9, which represents a change in the central reflected wavelength of the FBG 2 as a voltage change. FIG. 9 is a time waveform diagram showing an output voltage of a differential signal between two group signals in the present invention (group signal A and group signal B in FIG. 8), accompanying with another differential signal in prior art (FIGS. 17 and 18). If the signal includes noise, it is effective to take an average of a plurality of times measurement, e.g., 1000 times measurement, for eliminating (neglecting) the noise.

In FIG. 9, the differential signal in the prior art, which is shown in FIG. 18, is exhibited for comparison. In this embodiment according to the present invention, because the distance between the central wavelengths of two adjacent output channels of the AWG 6 is set to be 0.2 nm, the reflected light from one FBG 2 can be delivered from six output channels. However, in the prior art, since the distance between the central wavelengths of two adjacent output channels of the AWG 216 is 0.8 nm, the reflected light from one FBG 214 is delivered from only two output channels. Therefore, the differential signal in the present invention has a larger voltage change than that in the prior art with respect to the same strain generated by the PZT actuator 222 in FIG. 15.

Figure 10:
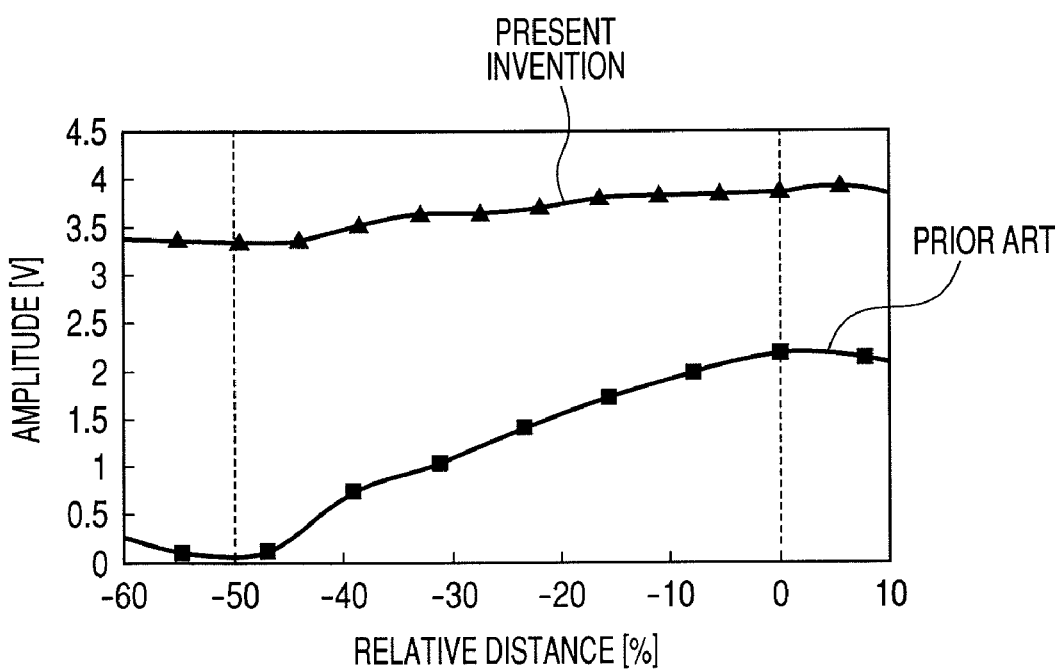
FIG. 10 is a graph showing a relationship between amplitude of signal and a relative distance of FBG in the present invention, accompanying with a result in the prior art shown in FIG. 19.
Figure 11:
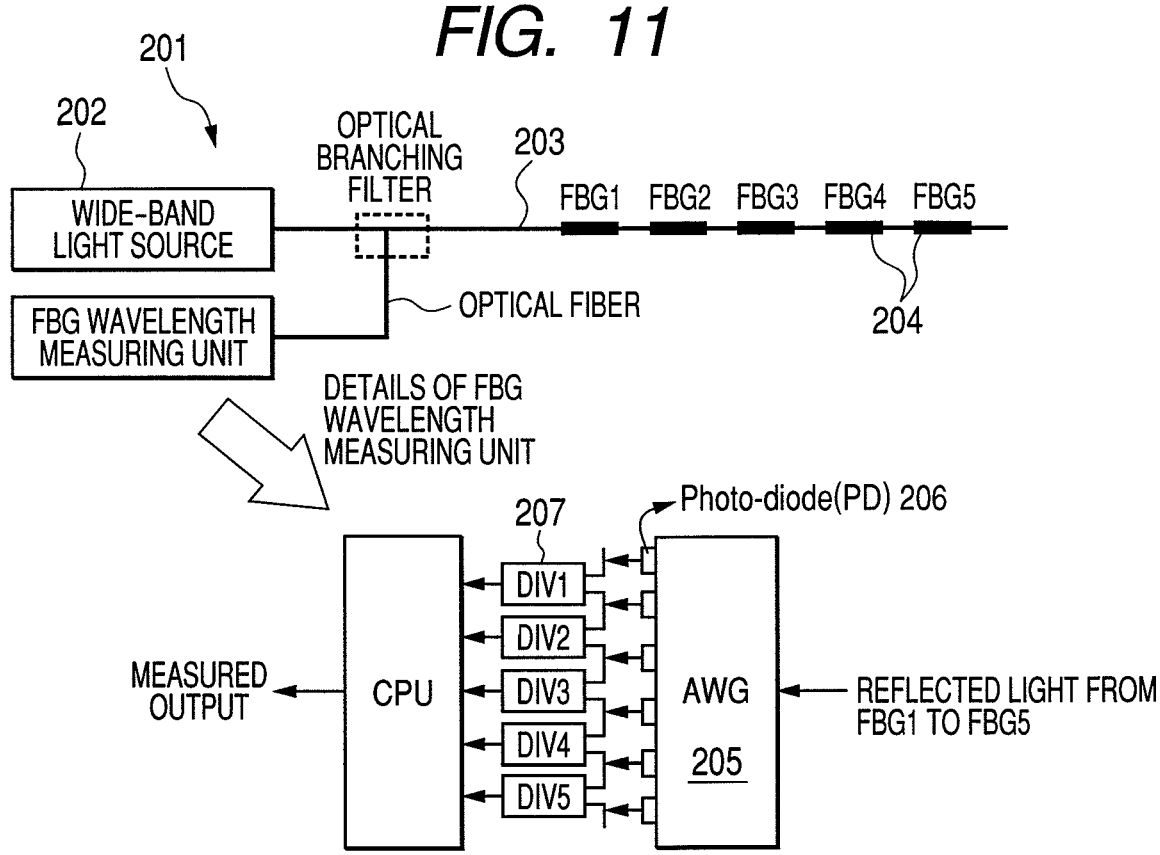
FIG. 11 is a schematic illustration showing a typical structure of a conventional physical quantity measuring apparatus.
Figure 12:
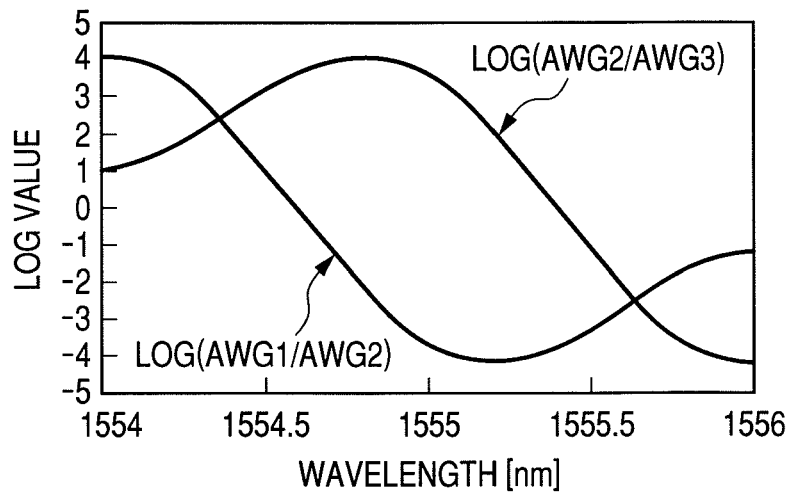
FIG. 12 is a graph showing a relationship between the logarithm value of a photo-electric current ratio and a central reflected wavelength of an FGB.
Figure 13:
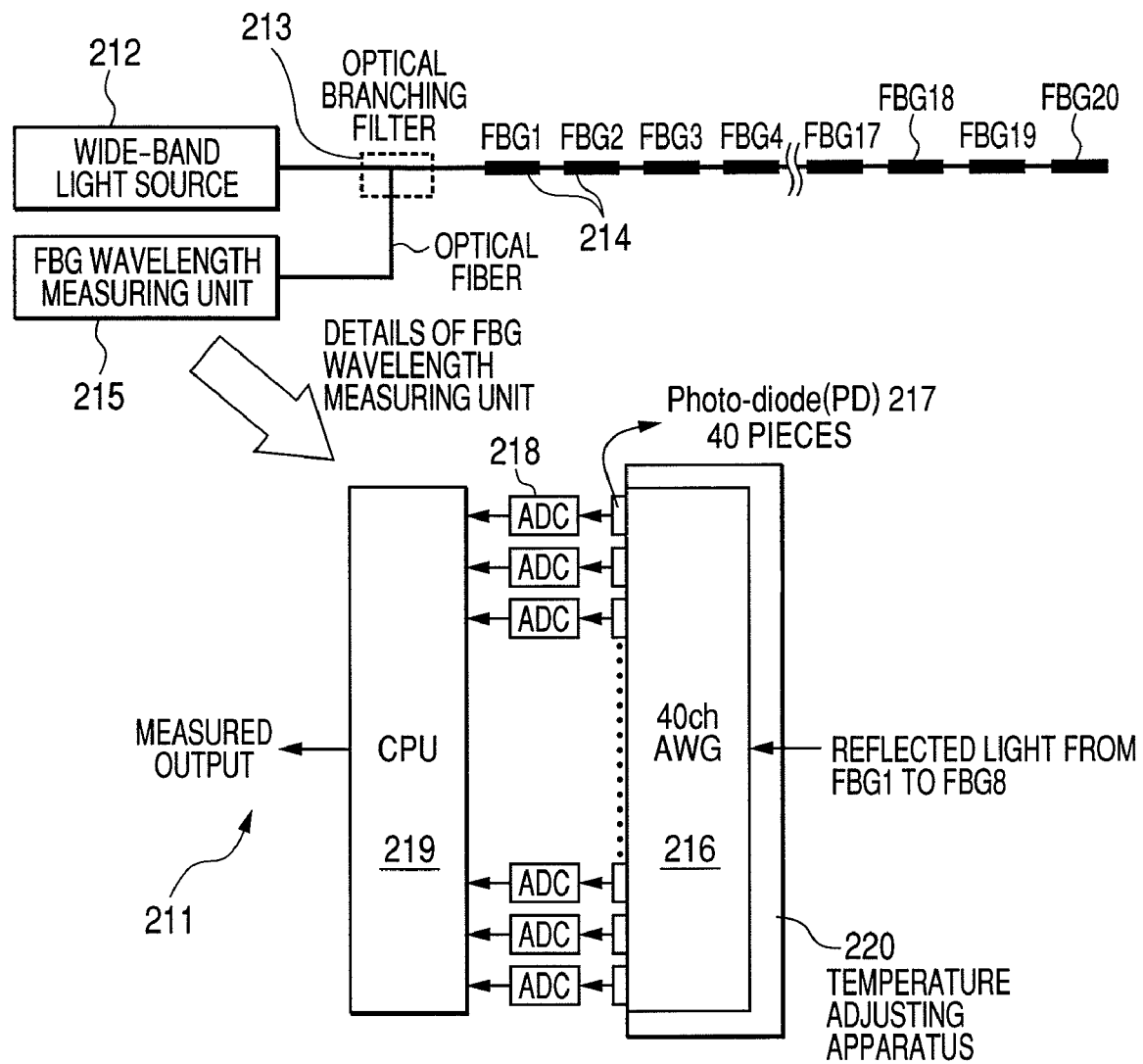
FIG. 13 is a schematic illustration showing the structure of another conventional physical quantity measuring apparatus.
Figure 14:
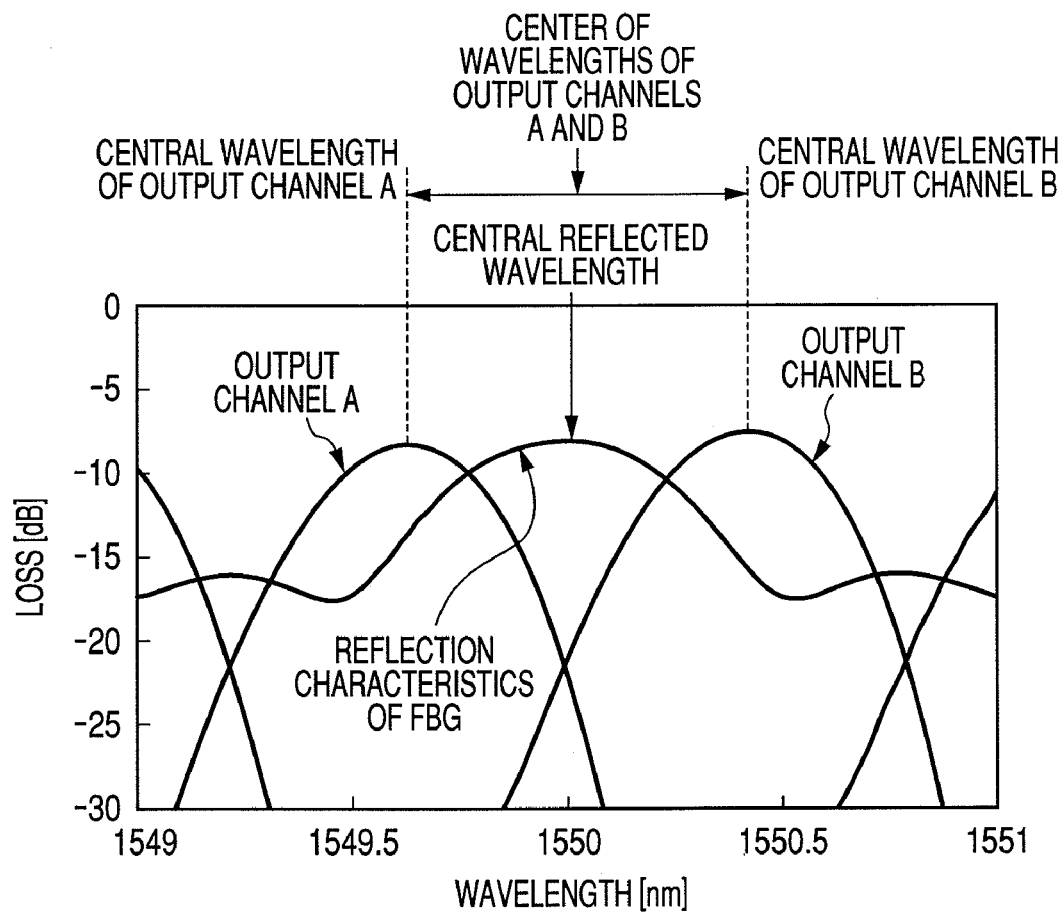
FIG. 14 is a graph showing an example of a relationship between a loss and a wavelength of spectrum exhibiting reflection characteristics of the FBG and channel-specific transmission characteristics of the AWG in the prior art.
Figure 19:
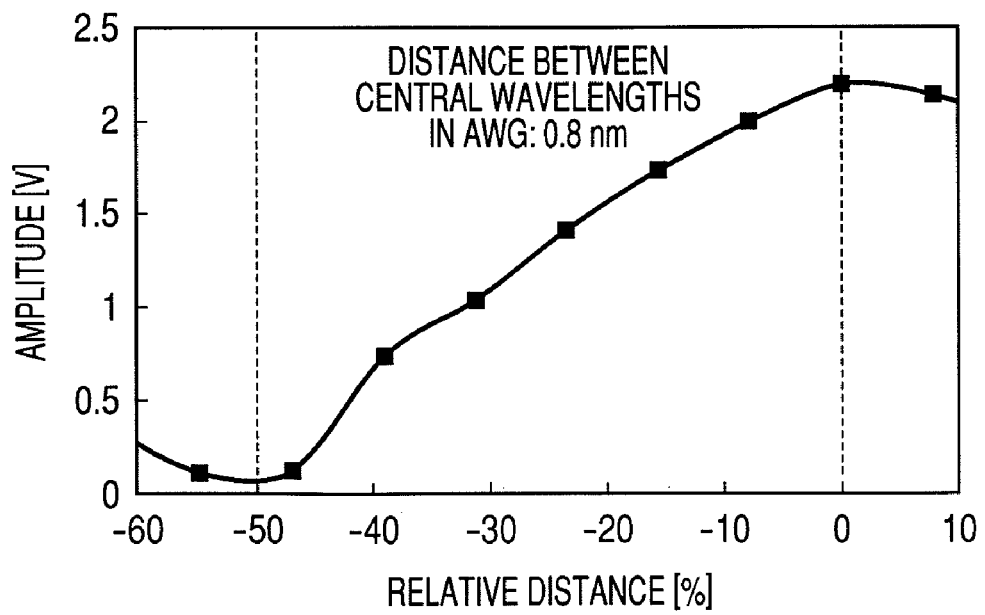
FIG. 19 is a graph showing a relationship between amplitude of signal and a relative distance of FBG in the conventional physical quantity measuring apparatus.

FIG. 10 is a graph showing a relationship between amplitude of signal and a relative distance of FBG in the present invention, accompanying with a result in the prior art shown in FIG. 19. It is revealed from FIG. 10 that the amplitude of signal in the present invention is larger than that in the prior art in a relative distance range of −50 to 0%. In other words, even when the relative distance changes from 0% to −50%, the amplitude of signal in the present invention does not drop significantly being compared with the prior art. That is, when there is no reduction in the amplitude of signal with respect to the relative distance, it means that there is no reduction in the sensitivity with respect to the relative distance. Accordingly, in the present invention, an almost constant and higher signal amplitude can be obtained without a need to adjust the temperature of the AWG 216 so that the central reflected wavelength of the FBG 214 should be located at the center of the central wavelength of the output channel of the AWG 216, as in the prior art.

In the above embodiment, the central wavelengths of six output channels, e.g., second to seventh output channels, of the AWG 6 are included in the one-tenth loss band of the fiber Bragg grating 2, and the second to fourth output channels and the fifth to seventh output channels are respectively denoted group A and group B, but it will be appreciated that the present invention is not limited to this arrangement.

When output channels are grouped, they may be divided into a group having central wavelengths shorter than the central reflected wavelength of the FBG and another group having central wavelengths longer than the central reflected wavelength. One group can include one or more output channels. The two groups do not necessarily include the same number of output channels.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A physical quantity measuring apparatus, comprising:
   an optical fiber in which fiber Bragg gratings are formed;
   a light source which is connected to the optical fiber, and that has a light emitting band including a band in which central reflected wavelengths of the fiber Bragg gratings change;
   an arrayed waveguide grating which is connected between the light source and the optical fiber via an optical branching filter, and that has output channels of which central wavelengths of at least three output channels are included in a one-tenth loss band of a reflected light by the fiber Bragg grating;
   light receiving devices for receiving light output from the output channels of the arrayed waveguide grating on a one-to-one basis; and
   a central reflected wavelength change detecting unit which is connected to the light receiving devices for estimating a change in a central reflected wavelength based on a physical quantity, by calculating a first group signal and a second group signal from light receiving signals corresponding to the at least three output channels and by calculating a differential signal between the first group signal and the second group signal, wherein:

the central wavelengths of output channels comprising the first group signal are shorter than the central reflected wavelength of the fiber Bragg grating; and the central wavelengths of output channels comprising the second group signal are longer than the central reflected wavelength of the fiber Bragg grating.

2. The physical quantity measuring apparatus according to claim 1, wherein:

the central reflected wavelength change detecting unit is further configured to store a relation which is obtained in advance between the differential signal and the change in the central reflected wavelength, and to determine the change in the central reflected wavelength by applying the calculated differential signal through an actual measurement to the relation.

3. The physical quantity measuring apparatus according to claim 1, wherein:

the central reflected wavelength change detecting unit is further configured to obtain the first group signal and the second group signal by removing a DC component from the light receiving signal output from each of the light receiving devices and by using an AC component thereof in calculation.

4. The physical quantity measuring apparatus according to claim 1, wherein:

the fiber Bragg grating is formed so that a full width of half maximum of the reflected light is at least 1.6 times longer than a distance between the central wavelengths of two adjacent output channels.

5. The physical quantity measuring apparatus according to claim 1, wherein:

a plurality of fiber Bragg gratings of which the central reflected wavelengths change in different ranges are formed in the optical fiber; and the arrayed waveguide grating includes the central wavelengths of at least three output channels in a one-tenth loss band of the reflected light by each fiber Bragg grating.

6. The physical quantity measuring apparatus according to claim 1, wherein:

at least three output channels are respectively included in the one-tenth loss band of the reflected light by the fiber Bragg grating on both a short wavelength side and a long wavelength side relative to the central reflected wavelength of the fiber Bragg grating; and the central reflected wavelength change detecting unit is further configured to obtain the first group signal by adding light receiving signals corresponding to the at least three output channels of which the central wavelengths are on the short wavelength side, to obtain the second signal by adding light receiving signals corresponding to the at least three output channels of which the central wavelengths are on the long wavelength side, and to estimate the change in the central reflected wavelength by calculating a differential signal between the first group signal and the second group signal.

\* \* \* \* \*